United States Patent [19]
Geib

[11] Patent Number: 5,751,357
[45] Date of Patent: May 12, 1998

[54] METHOD AND ARRANGEMENT FOR CODING AND DECODING A VIDEO DATA STREAM FOR ALL PICTURE ELEMENTS OF THE VIDEO DATA STREAM

[75] Inventor: Heribert Geib, Grafing, Germany

[73] Assignee: Siemens Aktiengesellschaft, Munich, Germany

[21] Appl. No.: 677,041

[22] Filed: Jul. 8, 1996

[30] Foreign Application Priority Data

Jul. 7, 1995 [DE] Germany .................. 195 24 872.4

[51] Int. Cl.$^6$ ............................................. H04N 7/50
[52] U.S. Cl. .................................... 348/400; 348/408
[58] Field of Search .................... 348/400, 401, 348/402, 405, 419, 408; H04N 7/36, 7/50

[56] References Cited

U.S. PATENT DOCUMENTS

| | | | |
|---|---|---|---|
| 4,541,012 | 9/1985 | Tescher | 348/400 |
| 5,196,933 | 3/1993 | Henot | 348/419 |
| 5,461,422 | 10/1995 | Hseih | 348/405 |

OTHER PUBLICATIONS

Fernseh–Und Kino–Technik, No. 3, (1994), MPEG–2–Bildcodierung für das digitale Fernsehen, J. De Lameillieure et al, pp. 99–107.

International Standard ISO/IEC 11172–2, Coding of Moving Pictures and Associated Audio, ISO/MPEG, 1993.

Draft International Standard ISO/IEC 13818–2 Generic coding of Moving Pictures and Associated Audio, 25 Mar. 1994.

ITU–T Rec. H. 261.

ITU–T Rec. H. 263.

M. Bierling, Displacement Estimation by Hierarchial Block Matching, 3rd SPIE Symp. on Visual Communication, Cambridge, MA. Nov. 1988.

*Primary Examiner*—Howard W. Britton
*Attorney, Agent, or Firm*—Hill, Steadman & Simpson

[57] ABSTRACT

A run length coding (RLC) is implemented in a coder/decoder unit (CD) in a forward path (VP) and a run length decoding (RLD) is implemented at the beginning of reconstruction in a reconstruction path for an internal reconstruction of the video data stream. As a result an added outlay seems to occur as compared to known methods. However, an interleaving of tasks that were successively implemented in previous methods is thereby enabled. A substantial reduction of the overall outlay compared to known procedures is achieved by the interleaving of the scan method (SV), quantizing (Q) and run length coding (RLC), run length decoding (RLD), inverse quantizing (IQ) and the inverse scan method (ISV).

16 Claims, 5 Drawing Sheets

METHOD AND ARRANGEMENT FOR CODING AND DECODING A VIDEO DATA STREAM FOR ALL PICTURE ELEMENTS OF THE VIDEO DATA STREAM

BACKGROUND OF THE INVENTION

The coding and compression of data to be transmitted is acquiring greater significance within the framework of telecommunication that is itself currently gaining significance, particularly in the multimedia field. The coding of the data should be implemented such that an optimally great compressing of the information is achieved given optimally low information loss.

Various methods for coding a video data stream are known (International Standard ISO/IEC 11172-2, Coding of Moving Pictures and Associated Audio. ISO/MPEG, 1993 or Draft International Standard ISO/IEC 13818-2 Generic Coding of Moving Pictures and Associated Audio, 25 Mar. 1994. or ITU-T Rec. H. 261 or ITU-T Rec. H. 263). These methods employ principles of prediction coding and of transformation coding. In prediction, difference images are produced by subtraction of predicted image data from the original image data to be coded. What is referred to as a motion-compensated prediction is employed for prediction. The fundamentals of the motion estimate required for this purpose and their application to the motion-compensated prediction are known to a person skilled in the art (Draft International Standard ISO/IEC 13818-2, Generic Coding of Moving Pictures and Associated Audio, 25 Mar. 1994) or M. Bierling, Displacement Estimation by Hierarchial Block Matching, 3rd SPIE Symp. on Visual Communication, Cambridge, Mass., November 1988, 1988).

In addition to the motion-compensated prediction, what is referred to as a motion-compensated interpolation is provided in these standardized methods for coding a video data stream. In conjunction with the MPEG terminology, motion-compensated interpolation is also referred to as bidirectional prediction. Within the framework of this application, however, the term motion-compensated interpolation shall be employed.

The local correlation between neighboring picture elements present in the difference images are exploited using a suitable transformation, with discrete cosine transformation (DCT). The coding transformation employed supplies coding transformation coefficients that are subjected to a quantization and to an entropy coding and are subsequently transmitted to a receiver wherein the entire coding method is implemented in inverse fashion, so that direct information about the picture elements is again available at the receiver after the implementation of the decoding.

SUMMARY OF THE INVENTION

The present invention is based on the problem of specifying a method and an arrangement for the implementation of the method that reduces the outlay for coding and decoding a video data stream.

In general terms the present invention is a method for coding a video data stream for all picture elements of the video data stream. Coding transformation coefficients are formed in a forward path by applying a coding transformation. A scan method is applied onto the coding transformation coefficients in the forward path of a coder/decoder unit. The scanned coding transformation coefficients are quantized in a quantization unit in the forward path of the coder/decoder unit. A run length coding is implemented in the forward path of the coder/decoder unit. A run length decoding is implemented at the beginning of the reconstruction in an internal reconstruction of the video data stream in a reconstruction path. Data obtained from the run length decoding is subjected to an inverse quantizing. The inversely quantized data is subjected to a scan method inverse relative to the scan method. Data obtained from the inverse scan method is subjected to a coding transformation that is inverse relative to an employed coding transformation. A reconstructed video data stream is subtracted from the video data stream, so that only the difference between the video data stream and the reconstructed video data stream is respectively processed.

Advantageous developments of the method of the present invention are as follows.

A variable quantization threshold is employed in the quantizing.

The method steps that are provided are combined with one another.

An absolute magnitude of each coding transformation coefficient is compared to a threshold. The threshold is incremented by a selectable value and a zero counter is incremented by the value 1 when the absolute magnitude of the coding transformation coefficient is lower than the threshold. When the absolute magnitude of the coding transformation coefficient is higher than the threshold, the coding transformation coefficient is quantized. The quantized coding transformation coefficient is stored in a quantization register. The value of the zero counter at this point in time is stored in a counter register and the zero counter is reset to a selectable counter value. The threshold is limited to a maximum threshold value after incrementation of the threshold by the selectable value. The value of the counter register represents a run value and the quantized coding transformation coefficient, taking the operational sine of the coding transformation coefficient into account, represents a level value.

All elements of the picture element block are set to the value zero at the beginning of the reconstruction of a picture element block in the reconstruction path. The value of the counter register is read into a working memory. The value of the quantization register is read into a working memory. The value of the quantization register is inversely quantized and yields a reconstructed coding transformation coefficient. The address of the picture element within the picture element block is calculated on the basis of the value of the counter register and on the basis of the scan method employed. The reconstructed coding transformation coefficient is written at the address of the picture element within the picture element block.

A calculation of configuratable parameters of employed coding algorithms and/or decoding algorithms ensues with a programmable processor and are employed in the coding algorithms and/or decoding algorithms. The method steps for the reconstruction of the video data stream are also implemented in a decoder unit of a receiver unit that receives the video data stream.

The present invention is also an arrangement for the implementation of the method. A coding transformation unit is provided for forming coding transformation coefficients for all picture elements of a picture element block of a video data stream. A first image block memory is provided wherein the coding transformation coefficients of the image element block are stored. A first means coupled to the first image block memory is provided for scanning, quantizing and run-length coding of the coding transformation coefficients of the picture element block. A second means coupled to an output of the first means is provided for run length decoding, for inverse quantizing and for inverse scanning. An inverse coding transformation unit coupled to an output of the second means is provided for forming reconstructed coding transformation coefficients, the inverse coding transformation unit is connected to data inputs of a second block memory. An image memory is provided for storing the reconstructed image. A third means is provided for the prediction of the following image of the video data stream. A substraction unit is provided. The substraction unit has a first input that represents the minuend for the acceptance of the video data stream, a second input that represents the subtrahend and that is coupled to an output of the inverse coding transformation unit, and an output coupled to an input of the coding transformation unit. A variable length coding unit connected to the output of the first means is provided for the implementation of a variable length coding.

Advantageous developments of the arrangement of the present invention are as follows.

The first means and the second means are combined with one another to form a configuratable data path in a circuit structure wherein switch elements are provided for common employment. A first input of a coding transformation coefficient register that is provided for storing an absolute magnitude of the respective coding transformation coefficient to be processed is coupled to the block memory. A first input of an operational sine register that is provided for storing an operational sine of the respective coding transformation coefficient to be processed is coupled to the block memory. A coding transformation coefficient comparison unit is provided, whereby an input of the coding transformation coefficient comparison unit is coupled to an output of the coding transformation coefficient register. A threshold register coupled to the coding transformation coefficient comparison unit is provided for storing the threshold. A threshold processing unit coupled to the threshold register is provided wherein the threshold is processed. A zero counter is provided, this being coupled to the coding transformation coefficient comparison unit for the implementation of the registration of the plurality of logically successive zero coding transformation coefficients. A reset unit with which the zero counter is reset to a selectable counter value is provided. At least one run memory register coupled to the zero counter is provided for storing the value of the zero counter directly before the resetting of the zero counter with the reset unit. A quantization unit is provided, whereby a first input of the quantization unit is coupled to the output of the coding transformation coefficient register. A second input of the quantization unit is coupled to an output of the operational sine register. A first output of the quantization unit is coupled to the block memory. A second output of the quantization unit is coupled to an input of at least one level memory register. A first input of an address calculating unit, in which the address of the block memory at which the reconstructed coding transformation coefficient is written is calculated for the reconstructed coding transformation coefficient, is coupled to a first output of the at least one run memory register. A second input of the address calculating unit is coupled to an output of the zero counter. An output of the address calculating unit is connected to an address input of the block memory for the activation of the required memory areas into which the reconstructed coding transformation coefficient is to be written. A first output of the at least one level memory register is coupled to a second input of the coding transformation coefficient register and to a second input of the operational sine register. A second output of the at least one level memory register and a second output of the at least one run memory register are connected to a unit in which the variable length coding and/or a variable length decoding is implemented. An adder unit is coupled to an output of the threshold register whereby the threshold is incremented by a selectable value in the adder unit when the coding transformation coefficient is higher than the threshold. The threshold processing unit has a threshold limiting unit that limits the threshold to a maximum threshold value. The quantization unit has a multiplier unit in which the coding transformation coefficient is multiplied by a reciprocal value $1/M_{Quant}$ of a quantization step $M_{Quant}$ or in which the coding transformation coefficient is multiplied by the quantization step $M_{Quant}$. The quantization unit additionally has a quantization limiting unit in which the quantized coding transformation coefficient is limited to a maximum quantization value.

The quantization unit additionally has a unit that enable a variable thresholding. A programmable processor is provided for calculating configuratable parameters of employed coding algorithms and/or decoding algorithms.

The inventive method makes an interleaving of the tasks ensuing successively in the known methods possible in the reconstruction of the video data stream, whereby the outlay for the processing is clearly reduced compared to the successively implemented, original individual tasks. In a development of the inventive method it is possible to calculate control parameters with a programmable processor (with the advantage of free algorithm selection) and transferring them to the coder that processes the picture elements of the video data stream with these parameters.

The present invention is in no way limited to the field of coding transformation and is most certainly not limited to the field of block-by-block DCT coding. The present invention can be employed in conjunction with practically all known methods of intra-image coding or methods thereof to be developed in the future, for example in conjunction with what is referred to as quad-tree coding or in conjunction with methods on the basis of object segments.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
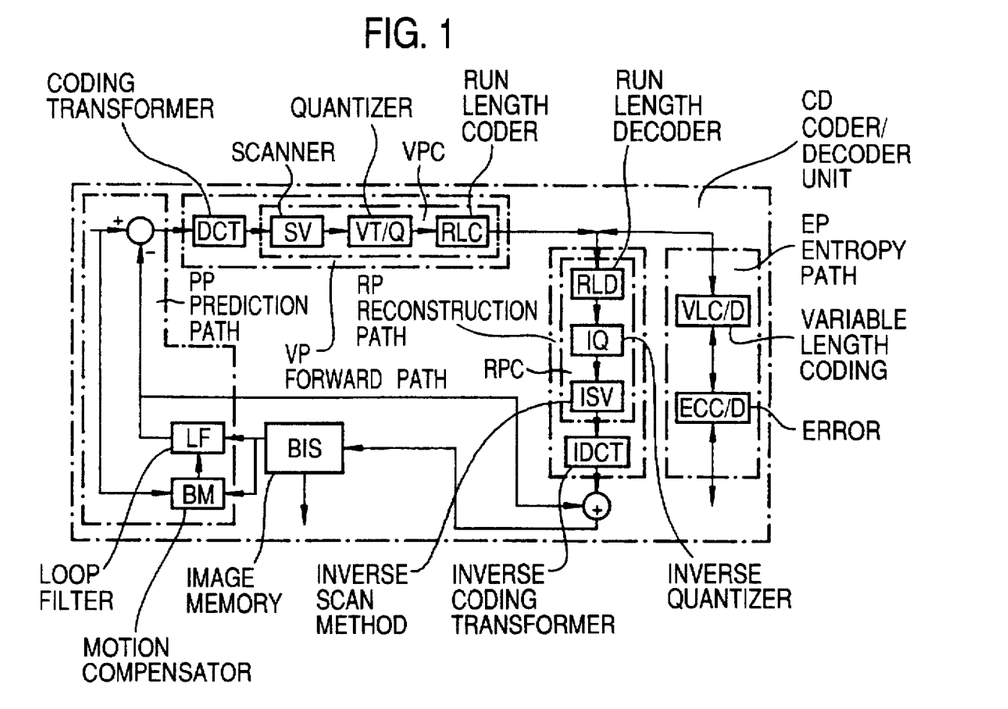
FIG. 1 is a block circuit diagram that depicts the inventive method and arrangement.

FIG. 1 describes a preferred exemplary embodiment of the inventive method in the form of a block diagram.

In a forward path VP of a coder/decoder unit CD, the following steps are applied on a video data stream to be coded, that is, to all picture elements of the video data stream or, respectively, to the difference images that are described as below.

First, a coding transformation DCT is applied to the video data stream. Discrete cosine transformation DCT is preferably employed for this. The inventive method, however, is not limited to this specific coding transformation but can be applied to any arbitrary coding transformation. Local correlations of the picture elements of an image of the video data stream are utilized for compressing the video data stream on the basis of the coding transformation DCT.

A scan or sampling method SV is applied to the coding transformation coefficients supplied by the coding transformation DCT. Various scan methods can be employed as scan method SV, for example the known zig-zag scan method or the known alternate scan method as well. Given a corresponding consideration of the scan method SV employed in the address calculation (described later) in the reconstruction of the video data stream, the selection of the scan method SV employed is of no significance. Any arbitrary scan method SV can thus be employed when the properties of the scan method SV are taken into account in the sequel, for example in the address calculation described below.

Given employment of a block-based method for coding the video data stream, thus, an image block or a difference image block is coding-transformed and is subsequently converted into serial data with the scan method SV.

The scanned coding transformation coefficients are then subjected to a quantization Q in a quantization unit Q. It is also possible to combine the quantizing Q with what is referred to as a variable thresholding VT. The application of variable thresholding VT is not standard in the coding according to the MPEG standard. Methods for quantizing Q the scanned coding-transformation coefficients are known and can be arbitrarily selected. The only thing that is important is that an inverse quantizing IQ (described below) is inverse relative to the respective quantizing method Q employed.

As last step in the forward path VP, a run length coding RLC is applied to the quantized coding transformation coefficients. When, for example, an MPEG method or a method according to the standard H.261 or according to the standard H.263 is employed as general coding method, the run length coding RLC supplies what are referred to as level values Li, whereby I indicates the index of the respective level value that lies in the range from 1–n. In the MPEG method or the H.261 standard, the plurality n of the level values amounts to a maximum of 63 when a component representing the constant part of the image block is referenced $L_{DC}$. An end-of-block mark EOB is sent after the last level value differing from zero when this level was not $L_{63}$. The component $L_{DC}$ representing the constant part of the image block could also be referred to as $L_0$ in this context.

The purpose of the coding is to generate optimally few level values. In the run length coding RLC, pairs of level values and run values Ri allocated to the respective level values are formed in addition to the component $L_{DC}$ representing the constant part, whereby I indicates the index of the respective run value that can lie between 1 and n−1. The run value Ri indicates the plurality of zeros before a following level value Li.

The following method steps are provided in a reconstruction path RP in which an internal reconstruction of the coded video data stream is implemented.

A run length decoding RLD that is inverse compared to the run length RLC employed in the forward path VP in the coding is applied in a first reconstruction step onto the run-length-coded data that were coded in the forward path VP. The insertion of the run length decoding in the internal reconstruction of the coded data stream in the coder/decoder unit CD is new compared to the previously standard procedure. Up to now, a run length decoding RLD was not provided in the coder/decoder unit CD for the internal reconstruction of the coded data stream but only in the reconstruction of received data streams since these were run-length-coded by a different transmission unit. Included among the disadvantages of this, however, is that two paths having a different structure were required.

A required path comprised the same structure as the reconstruction path RP, that is, with integrated run length decoding for decoding data streams received from a transmission unit.

A second path, however, was required for internal reconstruction of the coded data stream that is coded in the coder/decoder unit CD. With the inventive method and the inventive arrangement, the reconstruction path RP can be employed both for internal reconstruction of the coded data stream as well as for decoding of data streams received from a transmission unit. This means a significant saving of required components of the coder/decoder unit CD; this particularly yields substantial advantages in the mass production of a coder/decoder unit CD.

This additional method step already implemented in the coder/decoder unit CD looks like an additional outlay at first sight. As is explained below, however, the employment of the run length coding RLC and-of the run length decoding RLD in the coder/decoder unit CD denotes the possibility of substantially reducing the overall outlay of coding and decoding the video data stream.

For the arrangement of the reconstruction path RP (described below) this employment of the run length decoding RLD into the internal reconstruction of the coded data stream as well means that the same module can be employed both for the coder/decoder unit CD as well as for a decoder unit that is employed in a receiver unit, this comprising substantial advantages in a mass production of an arrangement realizing the reconstruction path RP.

Up to now, the modules of the reconstruction path RP in the coder/decoder unit CD differed from the modules required in the receiver unit for realizing the reconstruction path RP since the run-length-decoding RLD was not provided in the internal reconstruction of the coded data steam. However, it was nonetheless required in the receiver unit since the run length coding RLC was nonetheless provided in the coder/decoder unit CD, although not in the forward path VP but in the entropy path EP explained below.

The data received from the run length decoding RLD are now subject to the inverse quantizing IQ. The inverse quantizing IQ must be inverse relative to the quantizing method Q employed in the forward path VP.

Given employment of the known methods such as, for example, MPEG 1, MPEG 2, H.261, or JPEG, the inverse quantizing IQ is exclusively applied to the level values Li and to the level value $L_{DC}$. So that the above-described pairs of level values Li and appertaining run values Ri in pairs of run values Ri and appertaining, dequantized coding transformation coefficients Ci are obtained after the inverse quantizing IQ, whereby I again indicates the index of the respective, dequantized coding transformation coefficient C and whereby the index I can lie between 1 and n.

A dequantized coding transformation coefficient $C_{DC}$ corresponds in this context to the component of the level value $L_{DC}$ representing the constant part. Compared to previous methods, all multiplications with zero coefficients are completely eliminated in this case. These unnecessary multiplications were implemented in previous methods, for example a MPEG standard. An inverse scan method ISV that is inverse relative to the scan method SV employed in the forward path VP of the coder/decoder unit CD is now implemented in the dequantized coding transformation coefficients. The data obtained from the inverse scan method ISV is now subjected to an inverse coding transformation IDCT that is inverse relative to the coding transformation DCT employed in the forward path VP of the coder/decoder unit CD.

Corresponding to the respectively employed method, for example the MPEG1 method, the MPEG2 method or the H.261 method, a prediction is implemented in a prediction path PP in the coder/decoder unit CD so that only difference images need be coded and transmitted in the sequel, this enabling an additional data reduction. Methods for prediction are described in the respective methods. Thus, for example, methods for motion compensation BM are employed for prediction. The employment of a loop filter LF, for example, is also provided in the H.261standard. The loop filter LF is not employed in the MPEG method. The inventive method is not dependent on the different methods for prediction that are employed in the respective prediction path PP.

The date received from the run length coding RLC are now channel-coded in the entropy path EP and are transmitted to the receiver unit. The structure of the entropy path EP is in turn dependent on the method employed for coding the video data stream, for example, thus, an MPEG method or the H.261 standard. For example, a variable length coding VLC can be provided in the entropy path EP, as can a possibility for recognizing transmission errors ECC within the channel coding.

The methods provided in the entropy path EP are inversely implemented in the receiver unit, so that the reconstructed data can be supplied to a run length decoding RLD. This is also illustrated in FIG. 1 by the designation VLC/D and ECC/D. These designations describe that a variable length coding VLC and the coding for recognition of transmission errors ECC are implemented in the entropy path EP when the coder/decoder unit CD works as transmission unit, that is, generates a coded data stream.

When the coder/decoder unit CD works as receiver unit, that is, receives a channel-coded data stream and decodes it, then a variable length decoding VLD and a recognition of transmission errors ECD are implemented in the entropy path EP.

The employment of the coder/decoder unit CD both as a transmission unit, as well as a coder unit as well as also as a decoder unit is shown by a double arrow in FIG. 1, this describing that the coder/decoder unit CD can both receive data streams as well as send them.

Figure 2:
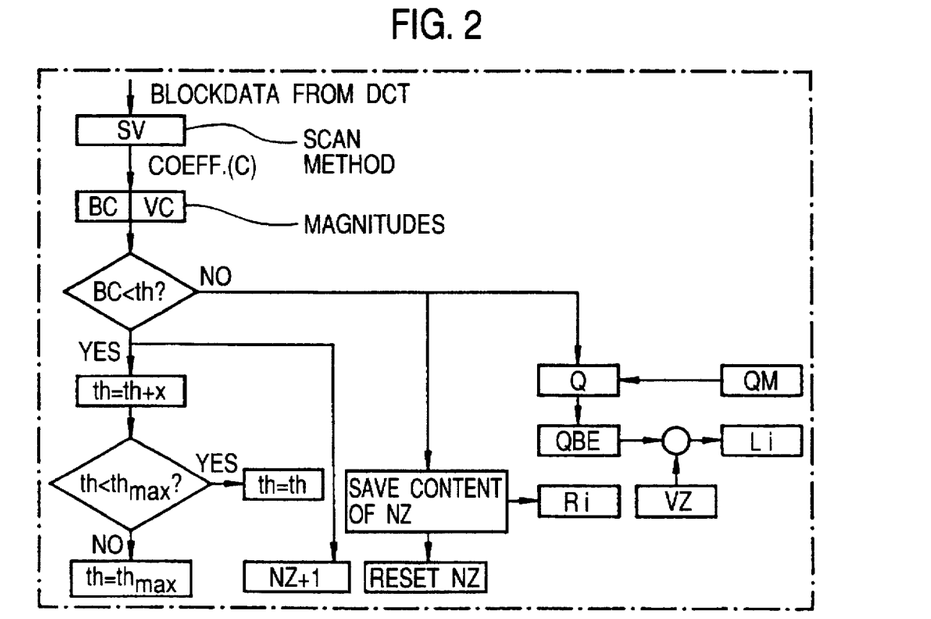
FIG. 2 is a flowchart that describes the interleaving of the scan method, the quantizing and the run length coding.

A preferred exemplary embodiment for the method steps within the forward path VP of the coder/decoder unit CD that can be applied given block-based methods is described in FIG. 2. FIG. 2 illustrates the possible interleaving of the method steps of scan method SV, variable thresholding VT, quantization Q and run length coding RLC of the coding transformation coefficients that are supplied by the coding transformation DCT.

The method disclosed here can be easily adapted by any person skilled in the art dependent on the coding method employed. The method disclosed here thus does not represent any limitation of the generally valid, inventive method.

As described above, the coding transformation coefficients received from the coding transformation DCT are subjected to a scan method SV and the scanned coding transformation coefficients are stored in the form of an absolute magnitude BC of the coding transformation coefficient and in the form of the absolute magnitude VC of the operational sine allocated to the coding transformation coefficient. The division of the coding transformation coefficient into magnitude and operational sine need not occur explicitly but is also implicitly contained in the numerical presentation of the coding transformation coefficient.

The separation into two registers for separate storing of the absolute magnitude BC of the coding transformation coefficient and the absolute magnitude of the operational sine VZ allocated to the coding transformation coefficient shown in the FIGS. 1–9 and described below is not absolutely necessary.

It is likewise possible that only the value of the coding transformation coefficient is stored and the absolute magnitude BC of the coding transformation coefficient is determined, this being stored in a separate register. The operational sine can also be directly determined from the stored coding transformation coefficient and can be directly further-employed.

The arrangement with two registers for storing the absolute magnitude BC of the coding transformation coefficient and of the operational sine VZ of the respective coding transformation coefficient described in the preferred exemplary embodiment thus also does not represent any limitation of the universal validity of the arrangement and of the method insofar as modifications of both the arrangement as well as of the method that refer to versions of taking the operational sine VZ of the coding transformation coefficient into account (for example, the direct employment of the operational sine coefficient in the numerical presentation of the stored coding transformation coefficient for quantizing Q) are provided, even though they are not explicitly shown in the FIGS. 1–9.

A check is then carried out for every absolute magnitude BC of the coding transformation coefficient to see whether the absolute magnitude BC is lower than a prescribable threshold th. The threshold th can be externally prescribed at the beginning of the method.

When the absolute magnitude BC lies below the threshold th, a zero counter NZ is incremented by the value 1. The threshold th is also incremented by a selectable value x. So that the threshold th does not become too high, it can be advantageous (in a further comparison) to compare the threshold th after the incrementation by the selectable value x to a maximum threshold value $th_{max}$ and to limit the threshold th to the maximum threshold value $th_{max}$ if necessary.

When the absolute magnitude BC of the coding transformation coefficient is not lower than the threshold th, the absolute magnitude BC of the coding transformation coefficient is quantized in the quantization unit Q, taking the appertaining operational sine VZ into account. A limitation to a maximum quantization value can be provided in the quantization Q. When the absolute magnitude BC of the coding transformation coefficient is not lower than the threshold th, the current counter reading of the zero counter NZ is also stored in a counter register and the zero counter NZ is reset to a selectable counter value. The selectable counter value to which the zero counter NZ is reset, however, need not have the value zero. The value of the counter register represents the respective run value Ri given employment of a method that uses run values and level values. In this case, the quantized value of the absolute magnitude BC of the coding transformation coefficient (which is stored upon addition of the operational sine VZ) represents the level value Li.

Figure 4:
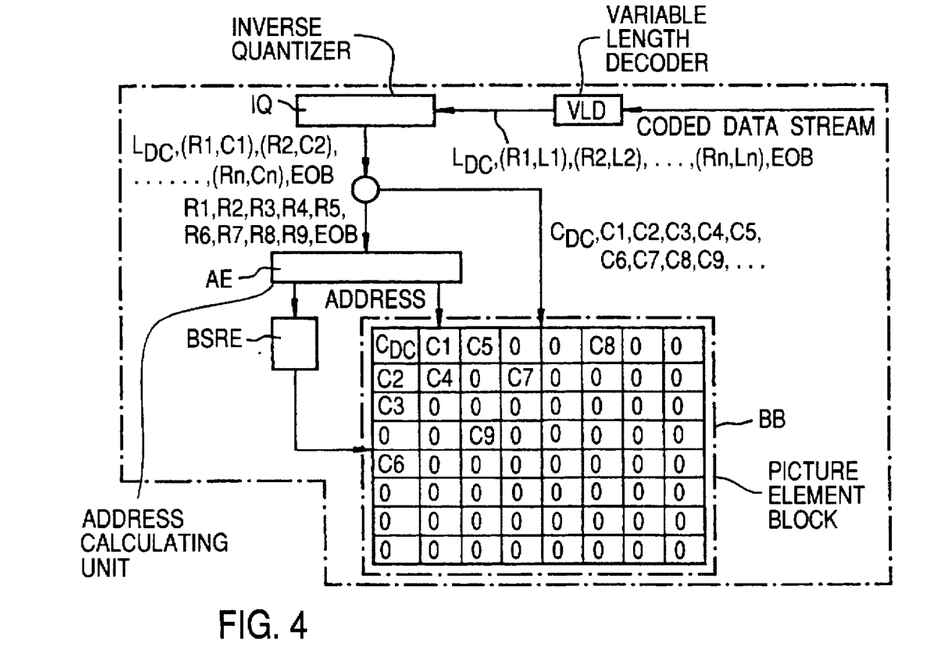
FIG. 4 a block circuit diagram that shows the interleaving of the inverse quantizing, the run length decoding and the inverse scan method in the decoding of the video data stream.

The method that is provided for the reconstruction of the coded video data stream is shown in greater detail in FIG. 4. This method is implemented within the reconstruction path RP. The preferred exemplary embodiment described in FIG. 4 shows the application of the method given employment of block-based methods but does not limit the universal validity of the inventive method. It is easily possible for anyone skilled in the art to transfer the advantages of the exemplary embodiment described in detail here onto the respectively employed method for coding video data streams.

It is assumed in this sub-method that both the component $L_{DC}$ representing the constant part as well as the run level value pairs (Ri, Li) are available. The level values Li are subjected to an inverse quantizing IQ and the dequantized coding transformation coefficients Ci are intermediately stored with the appertaining run values Ri. Given the employment of block-based methods, the serial data must now be converted into block data.

Such block data is later stored in a picture element block BB in the form that each coding transformation coefficient Ci is stored at the location of the picture element block BB whose value it represents within the image block. The address required for this purpose within the image element block BB at which the coding transformation coefficient is written is calculated in an address calculating unit AE, taking the respective run value Ri and the inverse scan method ISV into account.

At the beginning, that is, before the first coding transformation coefficient is stored, it is advantageous to set the entire image element block BB to the value zero. At the beginning, thus, each picture element of the picture element block BB is zero, no zeros having to be subsequently thus written into the image element block BB. This data motion is eliminated in the method described here.

Compared to the traditional algorithms, calculating power as well as dissipated power (also due to reduced data movement) are eliminated both in the inverse quantizing IQ as well as when storing and reading out picture elements without having to accept sacrifices in the quality of the processing. This method described below is newly implemented for each block of the block-based video data stream, that is, the picture element block BB is reset to zero at the beginning of each block.

An arrangement for the implementation of the inventive method is likewise described in FIG. 1. A coding transformation unit DCT is provided in this arrangement for implementation of a coding transformation DCT on the video data stream to be coded. As output quantity, the coding transformation unit DCT supplies the coding transformation coefficient belonging to the video data stream. Given employment of a block-based method, the coding transformation coefficients for the respective picture element block BB are respectively formed for all picture elements of a picture element block BB of the video data stream.

A first image block memory BS1 is provided for storing the coding transformation coefficients formed by the coding transformation unit DCT. Further, a first means VPC is provided for scanning, quantizing and run length coding of the coding transformation coefficients. The first means VPC is coupled to the image block memory BS (see FIG. 7). The first means VPC calculates run-length-coded, quantized coding transformation coefficients that are made available at an output of the first means VPC for further-processing.

A second means RPC is coupled to the output of the first means VPC for run length coding, for inverse quantizing and for inverse scanning of the run-length-coded, quantized, scanned coding transformation coefficients that are made available by the first means VPC. The second means RPC is coupled to the output of the first means VPC.

An inverse coding transformation unit IDCT is coupled to an output of the second means RPC, this being provided for forming reconstructed coding transformation coefficients. A coding transformation that is inverse relative to the coding transformation implemented in the coding transformation unit DCT is thus implemented in the inverse coding transformation unit IDCT.

A second image block memory BS2 is provided for storing the reconstructed coding transformation coefficients, this second image block memory BS2 being dimensioned such that, for example given block-based methods, at least the reconstruction coding transformation coefficients of a block can be respectively stored. The second image block memory BS2 is coupled to the inverse coding transformation unit IDCT. An image memory BIS is provided for storing the reconstructed image. The reconstructed image derives from the data that are made available by the inverse coding transformation unit IDCT.

A third means PP for prediction of the following image is provided with the inverse coding transformation unit IDCT. The structure of the third means PP can differ dependent on the method employed for coding the video data stream. Thus, for example, a loop filter LF and/or a fourth means BM for motion compensation BM can be provided (see FIG. 1).

Further components that the third means PP comprises are dependent on the method respectively employed for coding the video data stream. Any person skilled in the art is aware of potential expansions of the third means PP for prediction of the following image dependent on the method employed.

A substraction unit in which a first input representing the minuend is provided for the acceptance of the video data stream is coupled to an output of the third means PP. A second input of the substraction unit coupled to the third means PP represents the subtrahend of the difference to be formed by the substraction unit. An output of the substraction unit is coupled to an input of the coding transformation DCT, this making it possible to code only the difference images and to thus eliminate both calculating time as well as the required transmission capacity.

A fourth means EP for channel coding of the video data stream is coupled to the output of the first means VPC. The fourth means EP (again dependent on the method employed) has different components. Thus, for example, a unit for variable length coding VLC can be provided or a unit for error recognition and error correction ECC/ECD of the data to be transmitted, as can a unit for variable length decoding VLD. Expansions of the fourth means EP, as described above, are dependent on the method employed.

Figure 3:
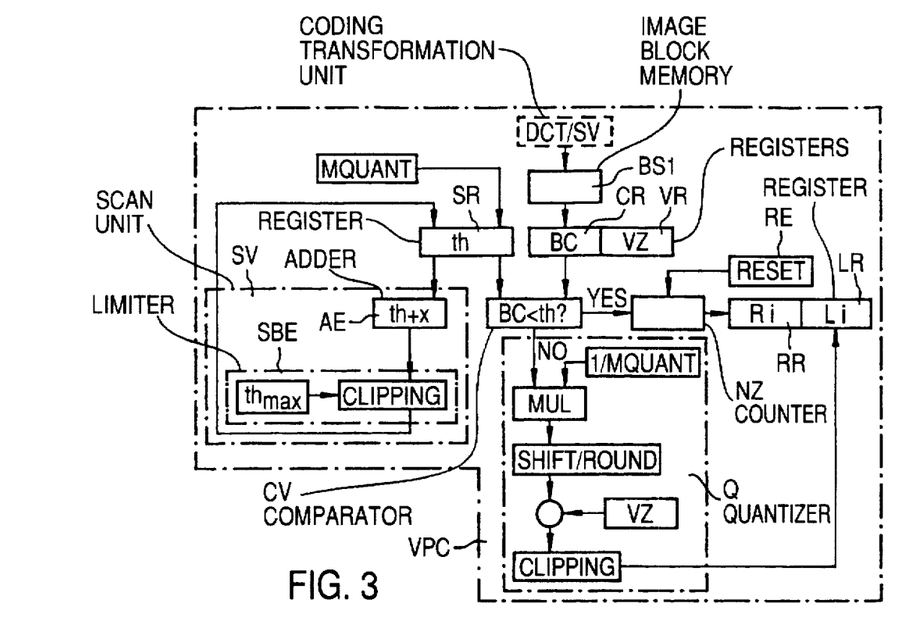
FIG. 3 is a block circuit diagram of the forward path of the coder/decoder unit.

FIG. 3 shows a preferred exemplary embodiment for realizing the first means VPC for scanning, quantizing and run-length-coding of the coding transformation coefficients. A scan unit SV for the implementation of the scan method SV on the coding transformation coefficients calculated by the coding transformation unit DCT is coupled to the first image memory BS1 in which the coding transformation coefficients are stored. A respective coding transformation coefficient register CR for storing the absolute amount BC of the respectively scanned coding transformation coefficient is provided for storing a respectively scanned coding transformation coefficient. A first input of the coding transformation coefficient register CR is coupled to the first image block memory BS1. Further, a respective operational sine register VR is provided for each scanned coding transformation coefficient for storing the operational sine of the respective coding transformation coefficient to be processed. A first input of the respective operational sine register VR is coupled to the first image block memory BS1. An input of a coding transformation coefficient comparison unit CV is coupled to a respective output of the respective coding transformation coefficient register CR in which the absolute magnitude BC of the respective coding transformation coefficient to be processed is stored.

The absolute magnitude BC of the respective coding transformation coefficient to be processed is compared to the threshold th in the coding transformation coefficient comparison unit CV. The threshold th is stored in a threshold register SR coupled to the coding transformation coefficient comparison unit CV. The threshold register SR is coupled to a threshold processor unit SV in which the threshold is processed when a variation of the threshold is provided. When an adaptive variation of the threshold th is not provided in the method, a threshold processing unit SV is not required. In this case, the threshold th is to be prescribed from the outside. When an adaptive variation of the threshold th is provided, only a starting value of the threshold th is externally prescribed in the threshold register.

The threshold processor unit SV preferably has an adder unit AE that is coupled to an output of the threshold register SR. In the adder unit AE, the threshold th is incremented by the selectable value x if the coding transformation coefficient is higher than the threshold th. This criterion is supplied by the coding transformation coefficient comparison unit CV.

When a limitation of the threshold th is provided, the threshold processor unit SV has a threshold limiting unit SBE that limits the threshold th to the maximum threshold value $th_{max}$. The maximum threshold value can be externally prescribed.

The zero counter NZ that is coupled to the coding transformation coefficient comparison unit CV is provided for the implementation of the registration of the plurality of logically successive zero-coding transformation coefficients. When the absolute amount BC of the coding transformation coefficient is lower than the threshold th, the value of the zero counter NZ is incremented by the value 1. The zero counter NZ is coupled to an output of the coding transformation coefficient comparison unit CV. A reset unit RE is provided for resetting the zero counter NZ to a selectable counter value. At least one run memory register RR that is coupled to the counter unit is provided for storing the value of the counter unit directly before the resetting of the zero counter NZ. A quantization unit Q is coupled to the coding transformation coefficient comparison unit CV. At least one level register LR is coupled to an output of the quantization unit Q.

Figure 5:
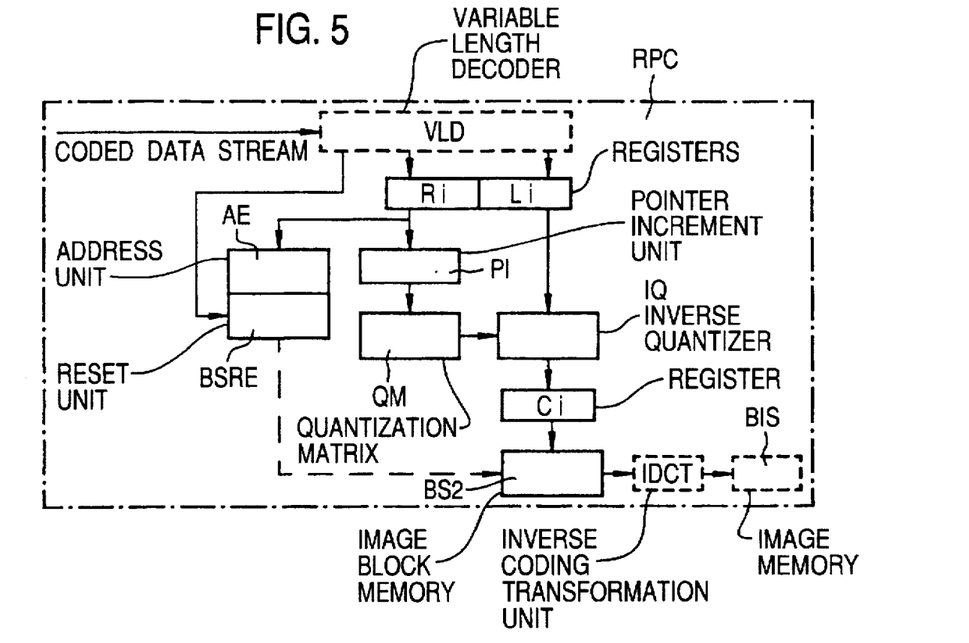
FIG. 5 is an expanded block circuit diagram for the decoding and reconstruction for video data streams that were coded according to the MPEG standard or the JPEG standard.

FIG. 5 describes a more detailed structure of the second means RPC. The arrangement can be employed both for internal reconstruction of the coded data stream as well as for decoding a coded data stream received from a transmission unit. This is an advantage particularly in mass production since the module in the coder/decoder unit CD is thereby required only once. This was not the case given previous arrangements, as explained above.

The run memory register RR of the respective run value Ri to be currently processed is coupled to a pointer incrementation unit PI. The run memory unit RR is likewise coupled to the address calculating unit AE.

Dependent on the scan method SV employed, the address at which the respectively reconstructed coding transformation coefficient is written in the second image block memory BS2 is calculated in the address calculating unit AE. The address calculating unit AE also has an image block memory reset unit BSRE with which all memory elements of the second image block memory BS2 are reset to the value zero or, respectively, to a selectable value at the beginning of the reconstruction of each and every image element block BB.

Further, a memory for storing a quantization matrix QM in the respective format of the scanned method SV employed is provided. What is achieved via the pointer incrementation unit PI is that (due to the run values) only the required quantization values are read out from the run length coding and employed for dequantization, that is, the inverse quantization IQ of the level values Li. Here, too, the conversion of serial format into the block format given employment of block-based pairs and, thus, two write-read operations are eliminated in comparison to known methods given employment of, for example, MPEG methods or JPEG methods, in addition to the elimination of otherwise uselessly implemented multiplications. A further advantage is that a default quantization matrix stored in the decoder and the matrix alternatively sent by the coder/decoder unit CD has the same serial format.

Given employment of the MPEG2 method, what is referred to as the alternate scan method can also be employed in addition to the zig-zag scan method, whereby, however, the quantization matrix QM continues to be transmitted in the format of the zig-zag method by the coder/decoder unit CD.

In order to multiply the level values Li present in the receiver unit in the alternate scan format with the proper, appertaining quantization in the decoder, an additional conversion of the quantization matrix QM from the zig-zag scan format into the alternate scan format must ensue here, whereas the default quantization matrices can be stored in both forms in the decoder. The memory for storing the quantization matrix QM is coupled to an inverse quantization unit IQ that is also coupled to the level memory register to be respectively processed. An inverse quantization IQ is implemented in the inverse quantization unit IQ on the basis of the quantization matrix QM and of the existing level value Li.

The result is a respective reconstructed coding transformation coefficient that is stored in the second block memory BS2 at the position within the second image block memory BS2 calculated by the address calculating unit AE.

Figure 6:
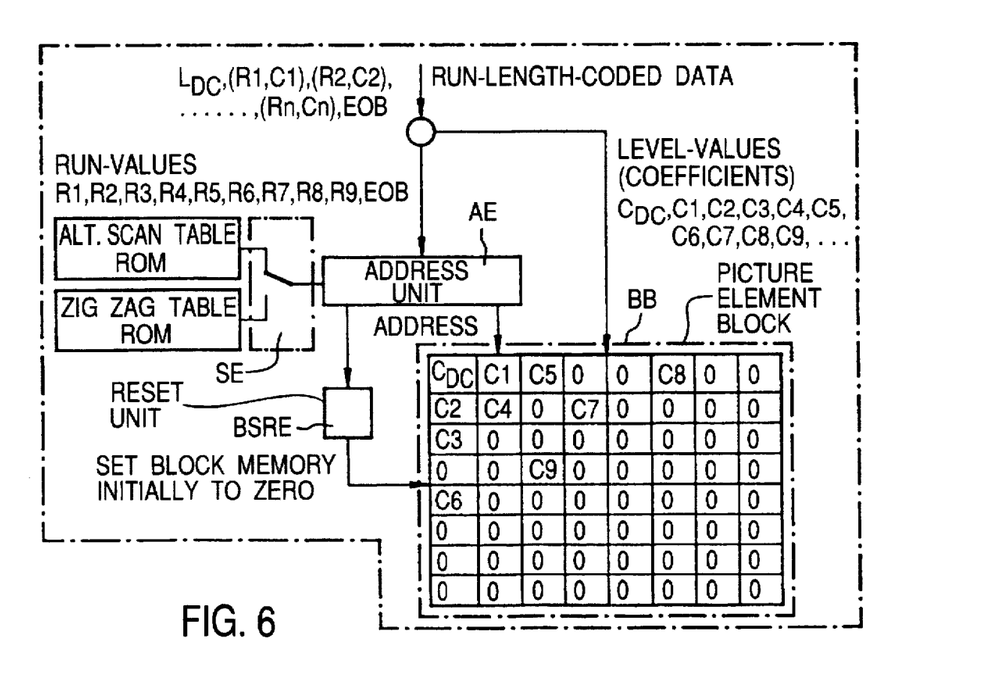
FIG. 6 is a block circuit diagram which shows the combination of the run length decoding with the selection of possible scan methods.

FIG. 6 shows an exemplary embodiment that describes a possible switching between two scan methods, the zig-zag scan and the alternate scan. The respectively employed scan method SV is selected by a switch unit SE and must be taken into account in the address calculation in the address calculating unit AE. The first means VPC and the second means RPC can be combined in the coder/decoder unit CD to form a configuratable data path, as a result whereof (as described below) the method for coding and decoding is substantially simplified.

A block memory BS that assumes both the function of the first block image memory BS1 as well as the function of the second block image memory BS2 is provided for eliminating memory capacity. This means that both the coding transformation coefficients that are made available by the coding transformation unit DCT as well as the reconstructed coding transformation coefficients that are made available by the inverse coding transformation unit IDCT can be successively stored in the block memory BS. A first input of the coding transformation coefficient register CR that is provided for storing the absolute magnitude BC of the respective coding transformation coefficient to be processed is coupled to the block memory BS. The operational sine register VR that is provided for storing the operational sine VZ of the respective coding transformation coefficient to be processed is coupled via a first input of the operational sine register VR to the block memory BS. The coding transformation coefficient comparison unit CV is coupled to the coding transformation coefficient register CR. The structure of the threshold register SR and of the threshold processor unit SV coupled to the threshold register SR corresponds to the structure that was described above. The structure of the zero counter NZ as well as of the reset unit RE of the zero counter NZ also corresponds to the structure of the first means VPC described above. Further, the zero counter has a further output coupled to the address calculating unit AE.

Figure 7:
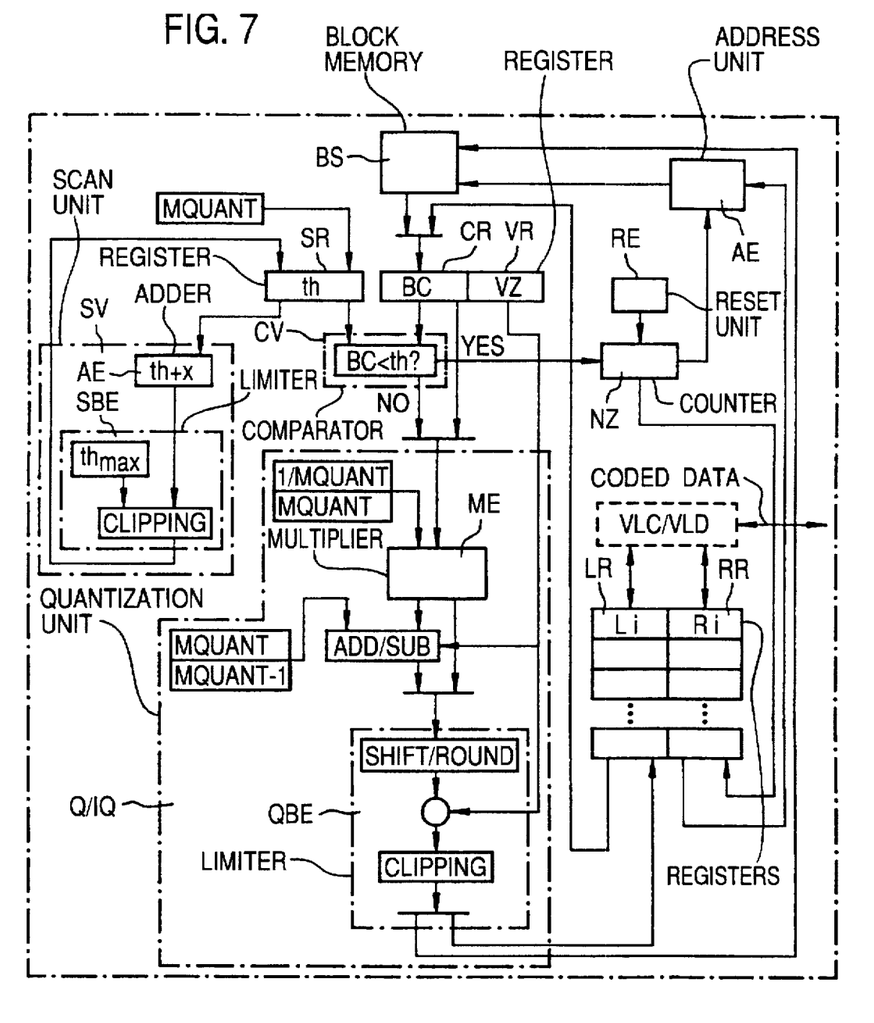
FIG. 7 is a block circuit diagram which describes an arrangement for the implementation of the coding and decoding of the video data stream.

The quantization unit Q has the components described in FIG. 7. A multiplier unit ME, in which the coding transformation coefficient is preferably multiplied with a reciprocal value $1/M_{Quant}$ of a quantization step $M_{Quant}$ or, respectively, by the value $M_{Quant}$ dependent on whether the quantization unit implements the function of quantizing Q or of inverse quantizing IQ. Additionally, the quantization unit Q can have a quantization limiting unit QBE wherein the quantized coding transformation coefficient is limited to a maximum quantization value. The quantization unit Q can also have an additional unit for the implementation of variable thresholding VD. A further component of the quantization unit Q is a unit for shifting and rounding the quantized or, respectively, dequantized coding transformation coefficients. Dependent on which register is applied to the multiplier unit ME, the reciprocal value $1/M_{Quant}$ of the quantization step $M_{Quant}$ or the quantization step $M_{Quant}$ itself, the quantization unit Q operates as quantizer or as dequantizer, that is, as the inverse quantization unit IQ.

Figure 8:
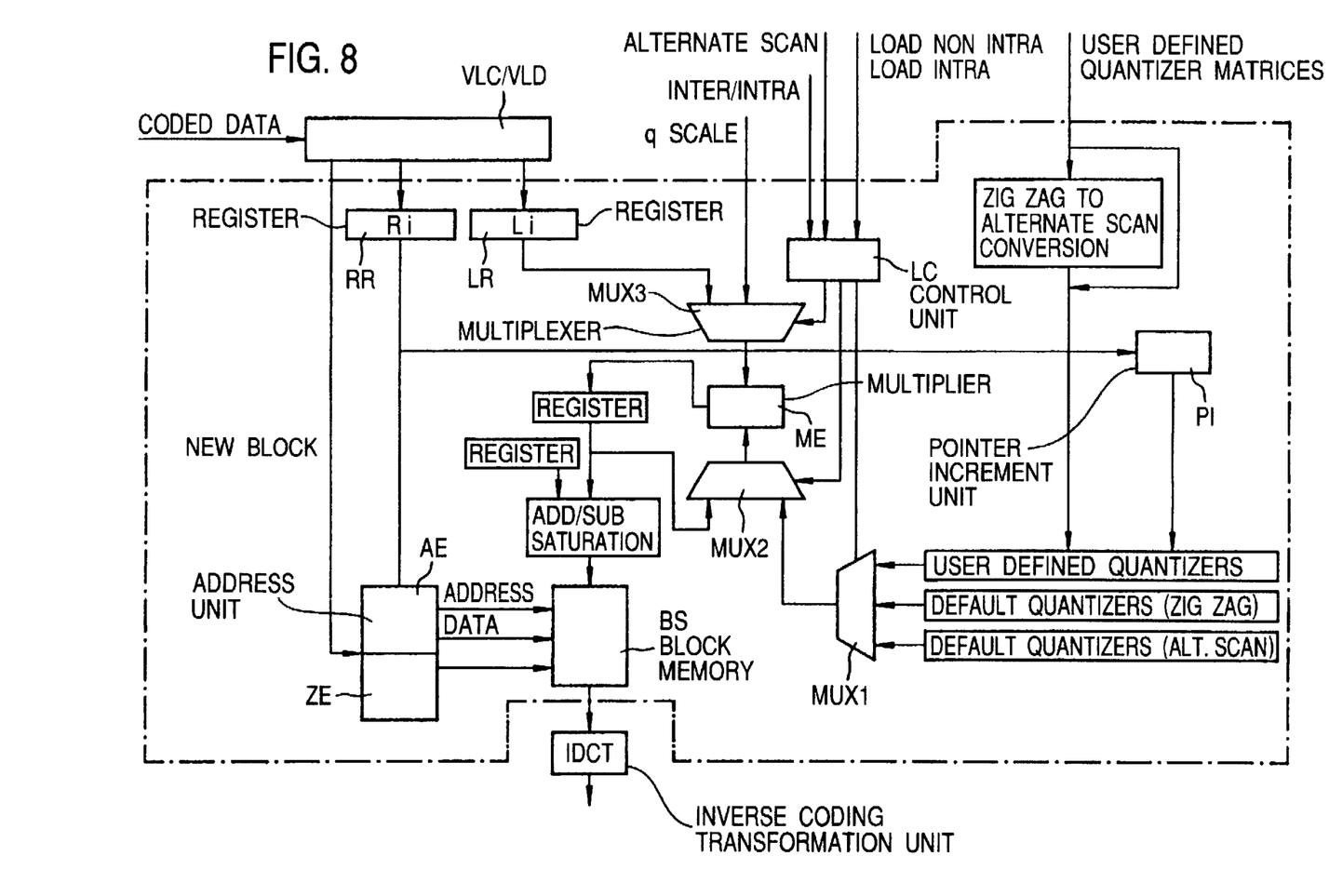
FIG. 8 is a sketch that describes an arrangement for combined implementation of the inverse quantizing, the run length decoding and the inverse scan method.
Figure 9:
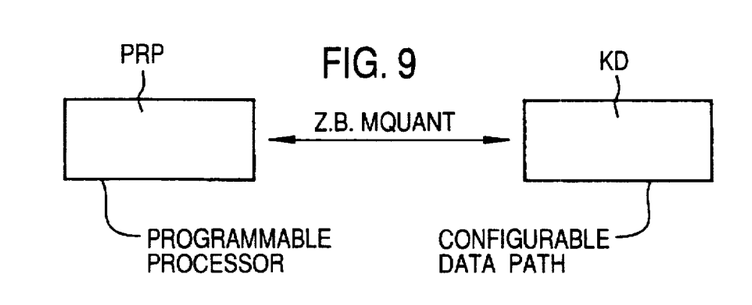
FIG. 9 is a sketch showing a possible, fundamental realization of the calculation of the control parameters with a programmable processor and the transfer of the control parameters to the arrangement of FIG. 7.

FIG. 8 describes an arrangement for selection of different scan methods and the selection of the quantization matrices in the respective format of the scan method by a first multiplexor MUX1. The first multiplexor MUX1, a second multiplexor MUX2 and a third multiplexor MUX3 are controlled by a control unit LC. The structure and the functioning of the arrangement shown in FIG. 8 has been essentially described above and may be seen from FIG. 8.

The quantization step width is set dependent on the filling level of a transmission buffer memory and is optionally adaptively set dependent on the image content of the video data stream to be coded. The image quality and the data rate required for the transmission of these images of the video data stream are thus influenced in a direct way.

Quantization step width and the upper limit for the variable threshold th to be prescribed given employment of a variable thresholding VT are important control parameters that change at most at the macro block level. These parameters can be calculated by a programmable processor PRP (with the advantage of free algorithm selection) and can be transferred to the configuratable data path KD in which the picture elements of the video data stream to be coded are now processed with these parameters. Thus, for example, the algorithms for calculating the quantization step $M_{Quant}$ can be freely selected or a maximum threshold VTmax can be defined and can be forwarded to an arrangement as shown, fore example, in FIGS. 7 or 8.

The hardware and, thus, the implementation of the inventive method can be additionally accelerated using the programmable processor PRP.

What is to be understood by configuratable data path KD in this context is a circuit structure wherein the switch elements of the first means VPC and switch elements of the second means RPC are provided in a circuit structure for common employment, that is, switch elements of the first means VPC and switch elements of the second means RPC are combined with one another.

In this way, one has the advantages of a programmable solution and can build a cost-beneficial but nonetheless high-performance coder/decoder unit CD with justifiable outlay in which the high, required calculating power at the pixel level (picture element level) is produced by a fast, dedicated hardware. The programmability is thereby only utilized where it is truly required (see FIG. 9).

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for coding a video data stream for all picture elements of the video data stream, comprising the steps of:
   forming coding transformation coefficients in a forward path by applying a coding transformation;
   applying a scan method to the coding transformation coefficients in a coder/decoder unit in the forward path;
   quantizing the scanned coding transformation coefficients in a quantization unit in the forward path of the coder/decoder unit;
   implementing a run length coding in the forward path of the coder/decoder unit;
   implementing a run length decoding at a beginning of reconstruction in an internal reconstruction of the video data stream in a reconstruction path;
   subjecting data obtained from the run length decoding to an inverse quantizing;
   subjecting the inversely quantized data to a scan method inverse relative to the scan method;
   subjecting data obtained from the inverse scan method to a coding transformation that is inverse relative to an employed coding transformation; and
   subtracting a reconstructed video data stream from the video data stream, so that only a difference between the video data stream and the reconstructed video data stream is respectively processed.

2. The method according to claim 1, wherein a variable quantization threshold is employed in the quantizing.

3. The method according to claim 1, wherein the method steps that are provided are combined with one another.

4. The method according to claim 1, wherein a calculation of configuratable parameters of employed coding algorithms and/or decoding algorithms ensues with a programmable processor and are employed in the coding algorithms and/or decoding algorithms.

5. The method according to claim 1, wherein the method further comprises the steps of:
- comparing an absolute magnitude of each coding transformation coefficient to a threshold;
- incrementing the threshold by a selectable value and incrementing a zero counter by a value of 1 when the absolute magnitude of the coding transformation coefficient is lower than the threshold; and
- when the absolute magnitude of the coding transformation coefficient is higher than the threshold,
  - quantizing the coding transformation coefficient, storing the quantized coding transformation coefficient in a quantization register,
  - storing a value of the zero counter at this point in time in a counter register, and
  - resetting the zero counter to a selectable counter value.

6. The method according to claim 5, wherein the threshold is limited to a maximum threshold value after incrementation of the threshold by the selectable value.

7. The method according to claim 5, wherein the value of the counter register is a run value and wherein the quantized coding transformation coefficient, taking an operational sine of the coding transformation coefficient into account, is a level value.

8. The method according to claim 5, wherein the method further comprises: setting all elements of the picture element block to a value of zero at a beginning of reconstruction of a picture element block in the reconstruction path;
- reading a value of the counter register into a working memory;
- reading a value of the quantization register into a working memory;
- inversely quantizing a value of the quantization register to provide a reconstructed coding transformation coefficient;
- calculating an address of the picture element within the picture element block on the basis of the value of the counter register and on the basis of the scan method employed; and
- writing the reconstructed coding transformation coefficient at the address of the picture element within the picture element block.

9. The method according to claim 8, wherein the method steps for the reconstruction of the video data stream are also implemented in a decoder unit of a receiver unit that receives the video data stream.

10. An arrangement for coding a video data stream for all picture elements of the video data stream comprising:
- a coding transformation unit for forming coding transformation coefficients for all picture elements of a picture element block of a video data stream;
- a first image block memory for storing the coding transformation coefficients of the image element block;
- a first device coupled to the first image block memory for scanning, quantizing and run-length coding of the coding transformation coefficients of the picture element block, the first device having an output;
- a second device coupled to the output of the first device for run length decoding, for inverse quantizing and for inverse scannings, the second device having an output;
- an inverse coding transformation unit coupled to the output of the second device for forming reconstructed coding transformation coefficients;
- the inverse coding transformation unit is connected to data inputs of a second block memory;
- an image memory for storing the reconstructed image;
- a third device is provided for the prediction of the following image of the video data stream;
- a subtraction unit, the substraction unit having a first input that is a minuend for acceptance of the video data stream, a second input that is a subtrahend and that is coupled to an output of the inverse coding transformation unit, and an output coupled to an input of the coding transformation unit; and
- a variable length coding unit connected to the output of the first device for implementing a variable length coding.

11. The arrangement according to claim 10, wherein a programmable processor is provided for calculating configuratable parameters of employed coding algorithms and/or decoding algorithms.

12. The arrangement according to claim 10, wherein the first device and the second device are combined with one another to form a configuratable data path in a circuit structure wherein switch elements are provided for common employment;
- wherein a first input of a coding transformation coefficient register that is provided for storing an absolute magnitude of the respective coding transformation coefficient to be processed is coupled to the block memory;
- wherein a first input of an operational sine register that is provided for storing an operational sine of the respective coding transformation coefficient to be processed is coupled to the block memory;
- wherein a coding transformation coefficient comparison unit is provided, an input of the coding transformation coefficient comparison unit being coupled to an output of the coding transformation coefficient register;
- wherein a threshold register coupled to the coding transformation coefficient comparison unit is provided for storing the threshold;
- wherein a threshold processing unit coupled to the threshold register is provided wherein the threshold is processed;
- wherein a zero counter is provided, the zero counter being coupled to the coding transformation coefficient comparison unit for the implementation of the registration of the plurality of logically successive zero coding transformation coefficients;
- wherein a reset unit with which the zero counter is reset to a selectable counter value is provided;
- wherein at least one run memory register coupled to the zero counter is provided for storing the value of the zero counter directly before the resetting of the zero counter with the reset unit;
- wherein a quantization unit is provided, a first input of the quantization unit being coupled to the output of the coding transformation coefficient register;
- wherein a second input of the quantization unit is coupled to an output of the operational sine register;
- wherein a first output of the quantization unit is coupled to the block memory and a second output of the quantization unit is coupled to an input of at least one level memory register;

wherein a first input of an address calculating unit, in which the address of the block memory at which the reconstructed coding transformation coefficient is written is calculated for the reconstructed coding transformation coefficient, is coupled to a first output of the at least one run memory register;

wherein a second input of the address calculating unit is coupled to an output of the zero counter;

wherein an output of the address calculating unit is connected to an address input of the block memory for activation of memory areas into which the reconstructed coding transformation coefficient is to be written;

wherein a first output of the at least one level memory register is coupled to a second input of the coding transformation coefficient register and to a second input of the operational sine register; and wherein a second output of the at least one level memory register and a second output of the at least one run memory register are connected to a unit in which the variable length coding and/or a variable length decoding is implemented.

13. The arrangement according to claim 12, wherein an adder unit is coupled to an output of the threshold register, wherein the threshold is incremented by a selectable value in the adder unit when the coding transformation coefficient is higher than the threshold; and wherein the threshold processing unit has a threshold limiting unit that limits the threshold to a maximum threshold value.

14. The arrangement according to claim 12, wherein the quantization unit has a multiplier unit in which the coding transformation coefficient is multiplied by a reciprocal value $1/M_{Quant}$ of a quantization step $M_{Quant}$ or in which the coding transformation coefficient is multiplied by the quantization step $M_{Quant}$.

15. The arrangement according to claim 12, wherein the quantization unit additionally has a quantization limiting unit in which the quantized coding transformation coefficient is limited to a maximum quantization value.

16. The arrangement according to claim 12, wherein the quantization unit additionally has a unit that enables a variable thresholding.

* * * * *